United States Patent [19]
Kaneko

[11] Patent Number: 4,682,218
[45] Date of Patent: Jul. 21, 1987

[54] SURVEYING INSTRUMENT WITH IMAGE DISPLAY UNIT

[75] Inventor: Atsumi Kaneko, Tokyo, Japan

[73] Assignee: Asahi Kogaku Kogyo Kabushiki Kaisha, Tokyo, Japan

[21] Appl. No.: 778,099

[22] Filed: Sep. 20, 1985

[30] Foreign Application Priority Data

Oct. 31, 1984 [JP] Japan .................................. 59-231030

[51] Int. Cl.[4] .................................................. H04N 7/18
[52] U.S. Cl. ..................................... 358/93; 358/229; 358/108; 358/225
[58] Field of Search ............... 358/107, 229, 225, 108, 358/87, 93, 209, 213, 100; 356/3, 138, 4, 5; 350/538, 568

[56] References Cited

U.S. PATENT DOCUMENTS

| | | | |
|---|---|---|---|
| D. 217,396 | 4/1970 | Gentile et al. | 358/185 X |
| 3,684,376 | 8/1972 | Lessard | 356/21 |
| 3,819,855 | 6/1974 | Rush et al. | 358/93 |
| 4,044,377 | 8/1977 | Bowerman | 356/21 X |
| 4,240,745 | 12/1980 | Green | 358/107 X |
| 4,259,688 | 3/1981 | Tokahara et al. | 358/107 |
| 4,282,548 | 8/1981 | Plummer | 358/107 |
| 4,389,791 | 6/1983 | Ackerman | 356/21 X |
| 4,542,986 | 9/1985 | Berdanier | 356/5 |

OTHER PUBLICATIONS

"Wheels to the Stars", *Technology Trends,* Optical Spectrum, Aug. '76, pp. 26-29.

*Primary Examiner*—James J. Groody
*Assistant Examiner*—Victor R. Kostak
*Attorney, Agent, or Firm*—Sughrue, Mion, Zinn, Macpeak, and Seas

[57] ABSTRACT

A surveying instrument in which the image being viewed can be easily observed independently of the position of the optical system, and distance and/or angle data can be simultaneously displayed. The instrument includes an optical system including an objective lens and focusing lens, a solid-state image pickup element, a video signal processing circuit for processing video signals provided by the solid-state image pickup element, and an image display section for displaying an image in response to outputs of the video signal processing circuit. Preferably, the image display section displays the sensed image along with distance and/or angle data at a position on the body of the surveying instrument which is not rotated with the optical system.

1 Claim, 3 Drawing Figures

SURVEYING INSTRUMENT WITH IMAGE DISPLAY UNIT

BACKGROUND OF THE INVENTION

The present invention relates to a surveying instrument using an electric power source, and more particularly to an improved telescope section of a surveying instrument.

Similar to an ordinary optical telescope, the telescope of a conventional surveying instrument includes an eyepiece section, a focusing lens section, and an objective lens section. In order to observe an object with the telescope thus constructed, the observer looks through the telescope with his eye at the eyepiece. When another observer uses the telescope, he must adjust the eyepiece and perform focusing before he looks through the eyepiece due to individual differences. If, in the case where the object under observation is changed and the direction to the object changes, then the position of the objective lens must also be changed. Therefore, when it is required to observe the zenith or a position near the nadir, it is necessary to use a special attachment, or the observer must assume an extremely unnatural posture. Futhermore, with the conventional surveying instrument, it is impossible for persons at different locations to observe the same object simultaneously. Furthermore, it is impossible with the conventional surveying instrument to record the observed image.

SUMMARY OF THE INVENTION

Accordingly, it is an object of the present invention to provide a surveying instrument in which the difficulties described above are eliminated and a surveying instrument is provided which is suitable for automatic measurement.

These as well as other objects of the invention are met by a surveying instrument, which instrument comprises an optical system including an objective lens and a focusing lens, a solid-state image pickup element, a video signal processing circuit for processing video signals provided by the solid-state image pickup element, and an image display section for displaying an image in response to outputs of the video signal processing circuit.

DESCRIPTION OF THE PREFERRED EMBODIMENTS

Figure 1:
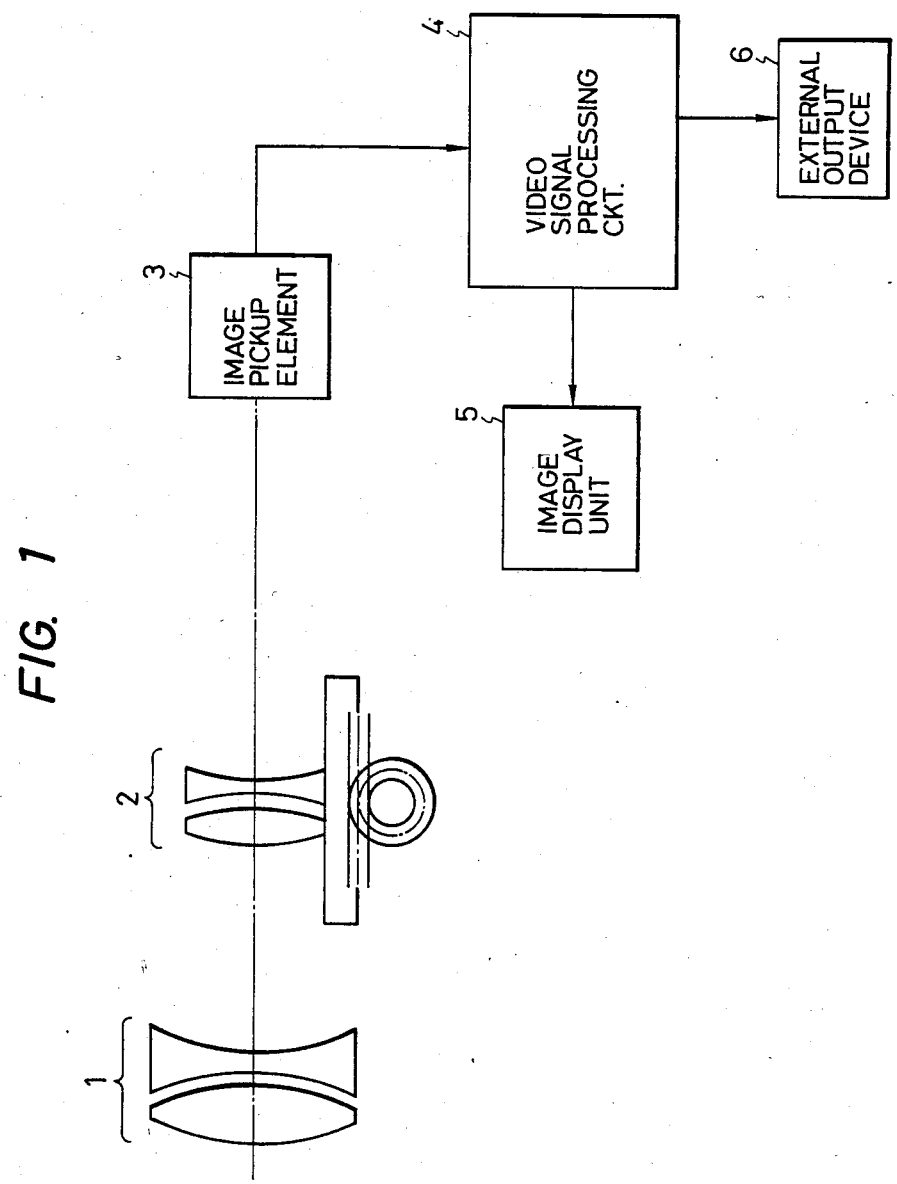
FIG. 1 is an explanatory diagram outlining the arrangement of a preferred embodiment of a surveying instrument of the invention.
Figure 2:
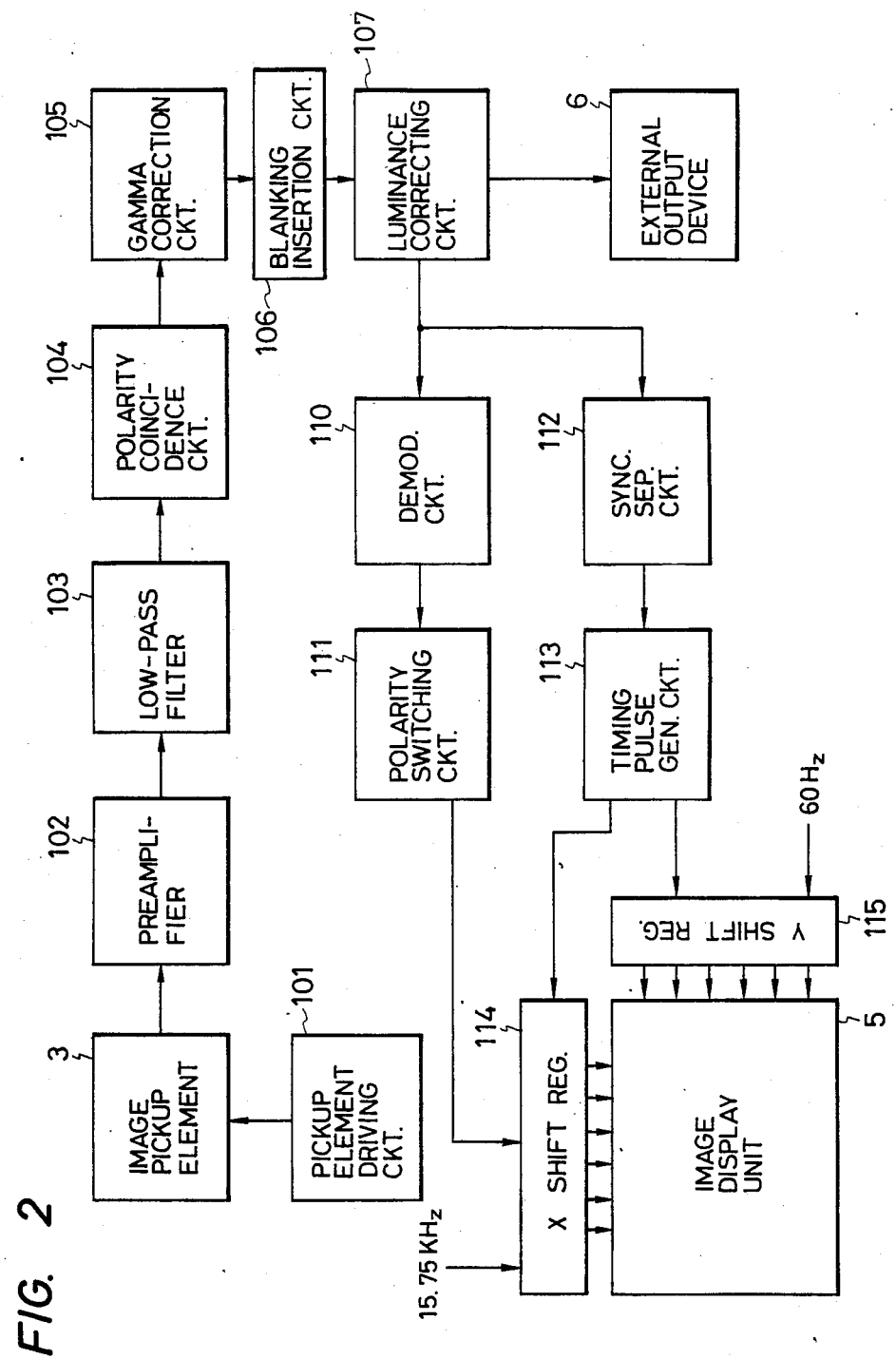
FIG. 2 is a block diagram showing an electric circuit in the embodiment of FIG. 1.

Preferred embodiments of the invention will be described with reference to FIGS. 1 through 3. FIG. 1 is a diagram showing the basic arrangement of a light-wave range finder. This light-wave range finder includes a telescope section including an objective lens 1 and a focusing lens 2, and a MOS solid-state image pickup element 3 arranged at the image-forming plane of the telescope section. The image pickup element 3 is connected to a video signal processing circuit 4 coupled to an LCD-type image display unit 5. The video signal processing circuit 4 is further coupled to an external output device 6 in order to permit remote control of the light-wave range finder. FIG. 2 shows an example of the video signal processing circuit 4. In the MOS solid-state image pickup element 3, picture elements forming the latter are charged in proportion to an image formed by the telescope section, and the charges of the picture elements are outputted in the form of a pulse train in response to a pulse signal from an MOS solid-state image pickup element driving circuit 101. The pulse train is amplified by a preamplifier 102. The pulse-shaped output waveform of the preamplifier 102 is converted into a continuous waveform by a low-pass filter 103. The output of the low-pass filter 103 is subjected to polarity coincidence by a polarity coincidence circuit 104. The characteristic of the output of the polarity coincidence circuit 104 is corrected by a gamma-correction circuit 105. This is necessary because the gamma characteristic of the MOS solid-state image pickup element 3 is different from that of a remote control monitor television set connected to the external output device 6. The blanking state of the output waveform of the circuit 105 is corrected by a blanking insertion circuit 106. The output of the circuit 106, after being subjected to contrast and luminance adjustment by a contrast and luminance correcting circuit 107, is outputted as a video signal by the external output device 6.

The video signal is demodulated by a demodulating circuit 110 which may be eliminated if the image pickup element does not supply its output signal in unmodulated form and its polarity is switched by a polarity switching circuit 111. The video signal thus processed is applied to an X shift register 114. A signal made synchronous with the video signal by a synchronizing separator circuit 112 is applied to a timing pulse generating circuit 113 to cause the latter to generate a timing pulse. This timing pulse, together with a horizontal synchronizing signal of 15.75 KHz, is applied to the aforementioned X shift register so that a horizontal scanning operation of the image display unit 5 is carried out. At the same time, the timing pulse singal from the timing pulse generation circuit 113 and a vertical synchronizing signal of 60 Hz are applied to a Y shift register 115 so that a vertical scanning operation of the image display unit 5 is performed. Thus, the desired image is displayed on the image display unit.

Figure 3:
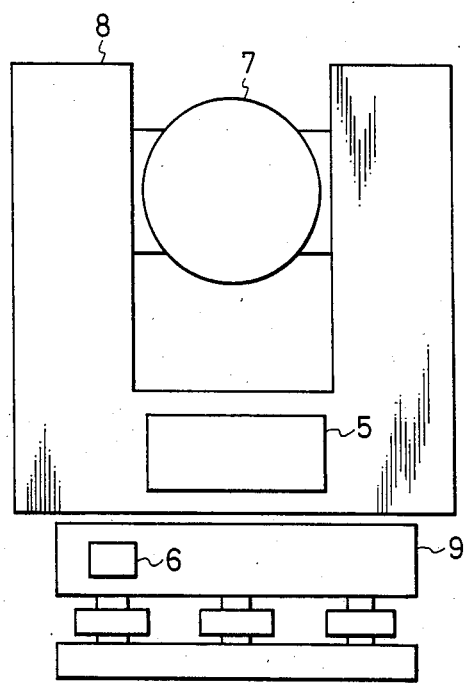
FIG. 3 is a diagram showing the external appearance of a surveying instrument body.

FIG. 3 shows the external appearance of a surveying instrument body. The image display unit 5 is arranged behind standards 8 so that its position is not affected by the rotation of the telescope 7. The external output device 6 is set on a base 9.

The operation of the preferred embodiment has been described with reference to FIG. 2 and with application to a light wave range. With the inventive surveying instrument, not only when the telescope section is directed towards the target, but also when the objective lens is turned upwardly or downwardly, the image of the target is displayed in a fixed positon defined by a stationary part such as standards.

In the surveying instruction of the invention, unlike a conventional instrument, the image of a target can be observed without looking through the eyepiece of the telescope. Therefore, it is unnecessary to adjust the visibility of the eyepiece section, and accordingly the operation time is reduced. Furthermore, a number of persons can observe the same image at the same time, and therefore the observation data can be made considerably high in reliability.

Futhermore, if the outputs are recorded by a recording device, then images observed previously can be reproduced at any time and the observation data can be reconfirmed. Still further, because the solid-state image pickup element has a higher sensititivity than the human eye and can observe infrared wavelengths, observation can be readily performed at night with the surveying instrument of the invention. If the surveying instrument body is modified so that the telescope section, the standards section, and the focusing section can be remotely operated, the operator can be located away from the surveying instrument during observation.

I claim:

1. A surveying instrument comprising:

a rotatably mounted optical system including an objective lens and a focusing lens;

a solid-state image pickup element positioned to receive a light output from said optical system;

a video signal processing circuit for processing video signals provided by said solid-state image pickup element, said video signal processing circuit comprising: a preamplifier receiving an output of said solid-state image pickup element, a low-pass filter receiving as an input an output of said preamplifier, a polarity coincidence circuit receiving as an input an output of said low-pass filter, a gamma correction circuit receiving as an input an output of said polarity coincidence circuit, a blanking insertion circuit receiving as an input an output of said gamma correction circuit, a luminance correcting circuit receiving as an input an output of said blanking insertion circuit, a video demodulator circuit receiving as an input an output of said luminance correcting circuit, a polarity switching circuit receiving as an input an output of said demodulator circuit, X and Y shift registers driving said image display section, said X shift register receiving as an input an output of said polarity switching circuit, a synchronizing signal separating circuit receiving as an input an output of said luminance correcting circuit, and a timing pulse generator circuit receiving as an input an output of said synchronizing signal separator circuit, outputs of said timing pulse generator circuit being applied to drive said X shift register and said Y shift register; and an image display section for displaying an image in response to outputs of said video signal processing circuit, said image display section being stationarily mounted on a body portion of said instrument.

* * * * *